United States Patent Office 3,233,966
Patented Feb. 8, 1966

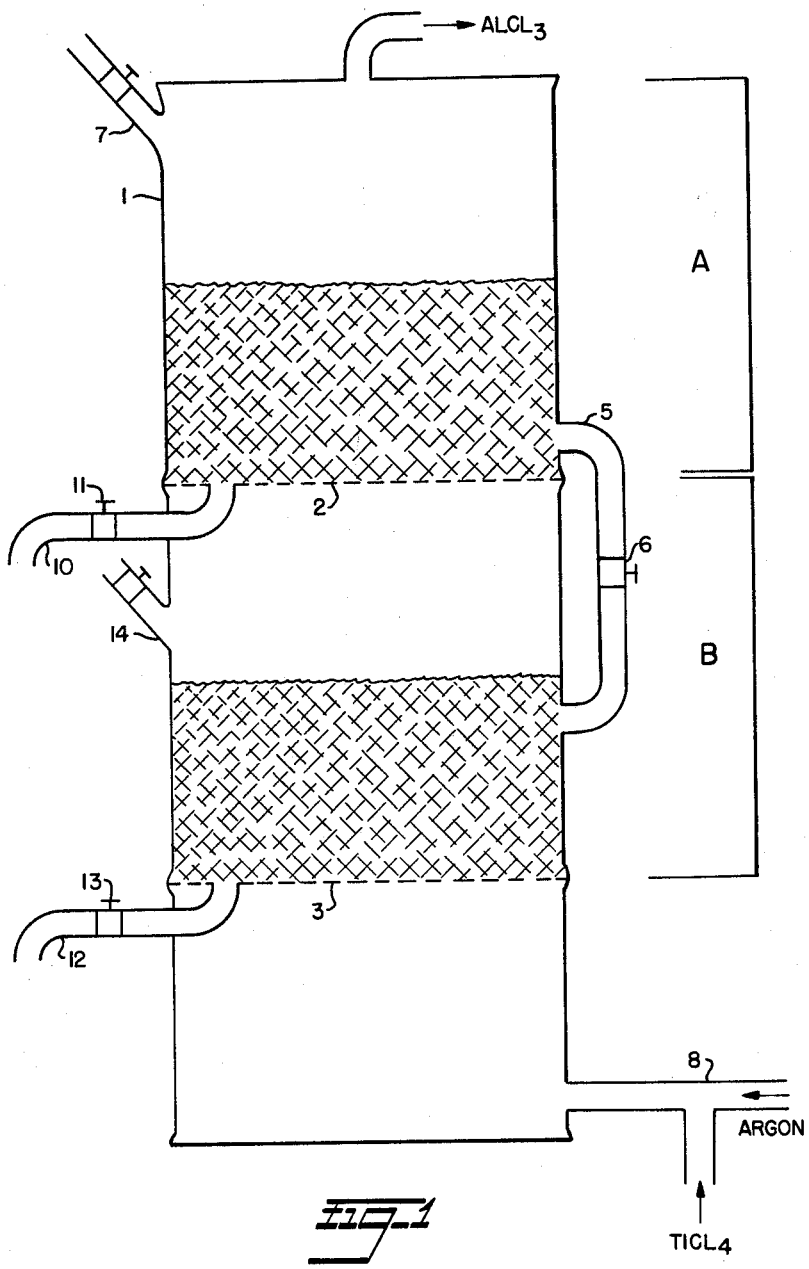

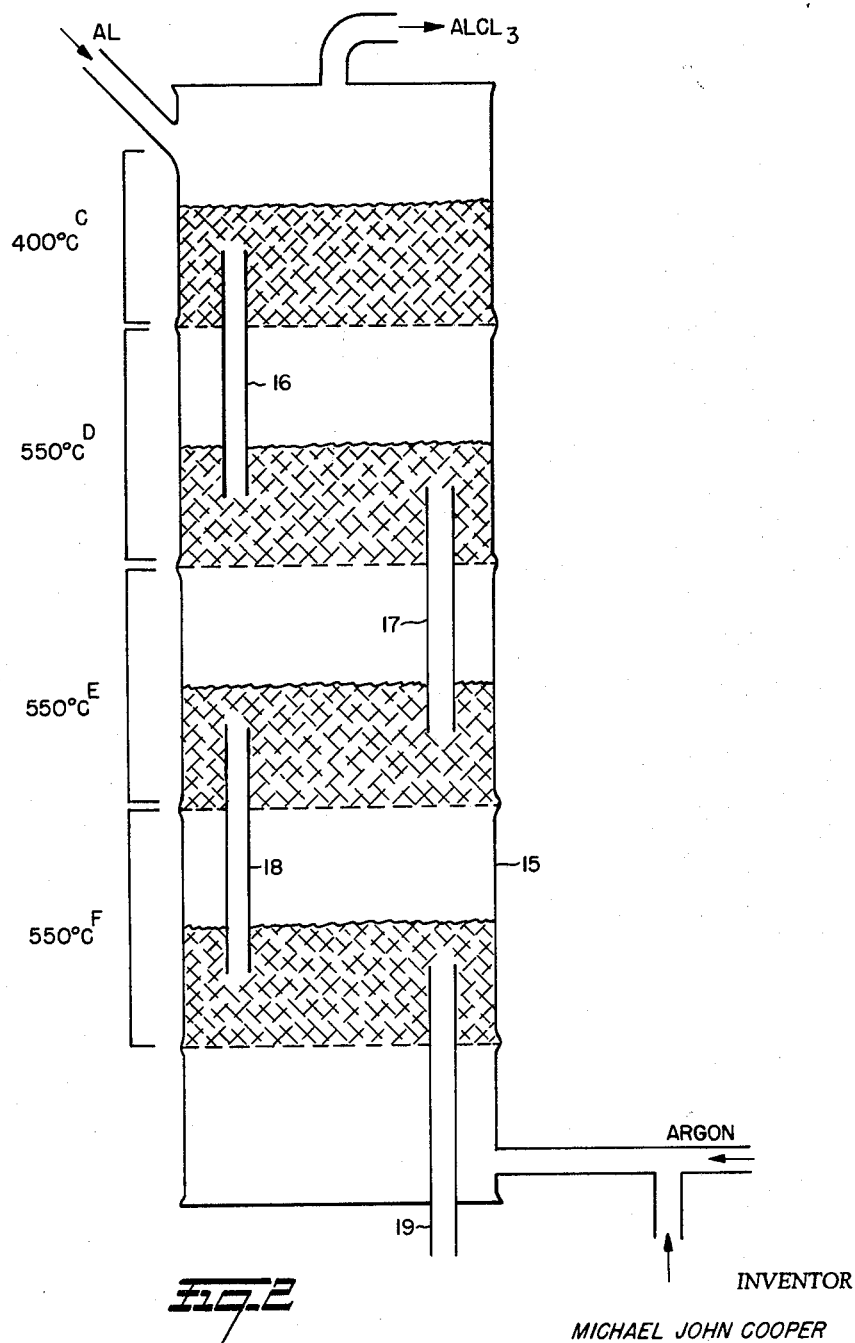

3,233,966
PROCESS FOR THE MANUFACTURE OF TITANIUM DICHLORIDE
Michael John Cooper, Basildon, and James Thomson Richmond, Grimsby, England, assignors to Laporte Titanium Limited, London, England, a British company
Filed July 28, 1961, Ser. No. 127,561
Claims priority, application Great Britain, July 11, 1958, 22,369/58
5 Claims. (Cl. 23—87)

This invention relates to the manufacture of titanium dichloride, which is suitable, for example, as a catalyst in certain polymerisation reactions. This is a continuation-in-part of our application Serial No. 825,652 filed July 8, 1959, now abandoned.

In British specification No. 754,869 is described a process for the manufacture of ductile titanium metal, in which finely divided aluminum and titanium tetrachloride are heated at a temperature within the range of 400° C. to 600° C. in the absence of a reactive gas to form aluminum chloride vapour and a solid product comprising a lower chloride of titanium, the latter product is mixed with further finely divided aluminum, and the mixture is heated at a temperature gradually increasing from 500° C. to 1100° C. to form titanium metal and aluminum chloride vapour. The first stage of the process is advantageously carried out by passing titanium tetrachloride vapour through the solid mixture of finely divided aluminum and solid product, formed while the mixture is stirred to expose fresh aluminum surfaces to the vapour, for example, in a baffled rotary kiln or a rotating tube device.

The present invention provides a process for the manufacture of titanium dichloride, wherein titanium tetrachloride vapour is reacted in the absence of a reactive gas with aluminum metal in the form of fluidised particles of the metal to produce a final product consisting substantially wholly of titanium dichloride, and the reaction temperature is maintained initially within the range of 400° C. to 475° C. until the fluidised material contains at most 95 percent, and advantageously at most 90 percent, of aluminum metal and subsequently at a temperature above 475° C. and not exceeding 650° C.

By "reactive gas" is meant a gas which reacts with aluminum or titanium tetrachloride to form a compound that is non-volatile under the conditions of reaction; and "a product consisting substantially wholly of titanium dichloride" means a product containing not more than about 3 percent of aluminum compounds calculated as uncombined aluminum.

By maintaining the reaction temperature initially within the aforesaid range the sintering of the aluminum, and consequent blockage or channelling in the fluidised bed and decreased reactivity are substantially avoided.

The temperature can be raised from the temperature employed in the lower temperature range (400 to 475° C.) to the temperature to be employed in the higher temperature range (475 to 650° C.) when the content of aluminum metal in the fluidised material at the lower temperature is within the range from 0 to 95% of the weight of the fluidised material at the lower temperature.

The particle size of aluminum metal is advantageously within the range of —150 to +200 mesh B.S.S. The titanium tetrachloride vapour may be passed through the fluidised material alone or in admixture with an inert gas, for example, argon.

In the stage of the reaction carried out in the lower temperature range titanium dichloride and trichloride and titanium metal are produced by reactions that may be represented as follows:

$$3TiCl_4 + 4Al \rightarrow 3Ti + 4AlCl_3$$
$$3TiCl_4 + 2Al \rightarrow 3TiCl_2 + 2AlCl_3$$
$$3TiCl_4 + Al \rightarrow 3TiCl_3 + AlCl_3$$

At the lower temperature the titanium products are mainly titanium metal and titanium trichloride. However, when the temperature is raised to above 475° C., the proportions of titanium metal and titanium trichloride fall due to the following reactions:

$$Ti + TiCl_4 \rightarrow 2TiCl_2$$
$$Ti + 2TiCl_3 \rightarrow 3TiCl_2$$

If the temperature is raised to above 475° C. before all the aluminum metal has reacted to form aluminum chloride, there will be also the following reaction:

$$Al + 3TiCl_3 \rightarrow 3TiCl_2 + AlCl_3$$

All these reactions are continued until the fluidised material consists substantially wholly of titanium dichloride. The aluminum chloride passes off as a gas. The overall reaction is substantially complete when the rate of recovery of titanium tetrachloride from the gaseous mixture leaving the bed is approximately equal to the rate of introduction of titanium tetrachloride into the bed. The overall reaction may be represented as follows:

$$3TiCl_4 + 2Al \rightarrow 3TiCl_2 + 2AlCl_3$$

The titanium metal and titanium subchlorides formed in the early stages of the reaction remain in the fluidised material, but there is a tendency for titanium trichloride to vaporise at temperatures above 550° C. Accordingly, in order to avoid substantial loss of titanium as titanium trichloride, it is of advantage that the reaction temperature should not exceed 550° C.

If substantially pure titanium dichloride is required it is essential to employ a temperature of greater than 475° C. At temperatures of less than 475° C. titanium dichloride can be formed, but it will always be in admixture with titanium metal and titanium trichloride.

The process may be carried out in a single bed of fluidised material, of which the temperature is initially maintained within the range of 400° C. to 475° C. and, when the fluidised material contains at most 95 percent, or advantageously at most 90%, of aluminum metal, is raised above 475° C. and advantageously not above 550° C. The aluminum powder to be fluidised may be placed in a vertical reaction vessel and fluidised by passing a current of an inert gas, for example argon, through the powder. The fluidised bed is heated by heating the vessel externally. When the temperature reaches, for example, 400° C., titanium tetrachloride vapour is introduced in admixture with an inert gas. Aluminum chloride is immediately evolved and, when the bed has a content of aluminum metal of at most 95 or 90 percent, the temperature of the bed is slowly raised to 500–550° C. and the rate of introduction of the titanium tetrachloride vapour is increased until a small amount appears in the effluent vapours. As the reaction proceeds the fluidised bed increases in weight and volume. The reaction is continued until substantially all the titanium has been converted into titanium dichloride. The supply of tetrachloride vapour and heat are then stopped. The bed is freed from excess titanium tetrachloride by passing the inert gas through it, and the bed is then discharged from the reaction vessel into a suitable container in an inert atmosphere, for example, of argon, nitrogen or carbon dioxide.

Instead of carrying out the reaction in a single fluidised bed, it may be carried out in a plurality of fluidised beds by passing the aluminum particles in countercurrent to the titanium tetrachloride vapour successively through a plurality of beds in which the particles are maintained in the fluidised state, the aluminum particles being introduced into the first bed and the vapour into the last bed of the series. The temperature in the first bed, and, if desired, in one or more succeeding beds, is maintained within the range of 400° C. to 475° C. until the fluidised material contains at most 95 to 90 percent of aluminum metal, and the reaction is completed in the succeeding bed or beds operated at a temperature above 475° C. and not exceeding 550° C. or 650° C. In such a case the material withdrawn from the beds operating within the range 400–475° C. contains at most 95% and preferably not more than 90% of aluminum metal and also contains at least some of at least one of the group consisting of titanium metal, titanium dichloride and titanium trichloride. This constitutes the feed material to the beds operating in the temperature range 475° C.–650° C. and preferably in the range 475° C.–550° C. In these beds the reaction is usually allowed to go to completion to provide a bed consisting substantially wholly of titanium dichloride.

The process of the present invention may also be applied to the manufacture of titanium dichloride by reacting titanium tetrachloride vapour in the absence of a reactive gas with aluminum metal in a fluidised bed of particles consisting of not more than 95% by weight of aluminum wherein titanium dichloride-containing material is drawn off from the bed continuously and wherein aluminum-metal-containing material containing not more than 95% by weight of aluminum and containing some of at least one of the group consisting of titanium metal, titanium dichloride and titanium trichloride is continuously added to the bed, the reaction temperature being maintained within the range 475–650° C. The term "continuously" as applied herein to the addition of aluminum metal to a reaction zone, or the removal of the titanium dichloride containing product from a reaction zone, includes both uninterrupted addition or removal, and also addition or removal which is carried out intermittently throughout the period of the reaction.

Alternatively, the aluminum containing material added to the bed may be added at such a controlled rate that the aluminum metal content of the bed does not exceed 95% by weight. In such a case the aluminum containing material added may be powdered aluminum itself.

The following examples illustrate the invention:

*Example 1*

The reaction vessel consisted of a vertical tube of Pyrex glass having an internal diameter of one inch and fitted near its lower end with a porous plate. At its lower end the tube was connected to a siutable evaporator, which was fitted with metering devices to measure the volumes of inert gas and titanium tetrachloride vapour introduced into the tube. At its upper end the tube was connected to a filter maintained at about 150° C. to remove condensed aluminum chloride from the effluent gas.

After purging the apparatus with argon, 100 grams of aluminum powder of −150 to +200 mesh B.S.S. were placed in the reaction tube, and the powder was fluidised by means of dry oxygen-free argon introduced at the rate of 2 to 2.5 litres per minute. The temperature of the fluidised bed was raised to 400° C. by external heating, and titanium tetrachloride vapour was introduced into the lower end of the tube from the evaporator at the rate of approximately 1 gram per minute of titanium tetrachloride. After 20 minutes the fluidised bed had a content of aluminum metal of 89.2%, and 12 grams of aluminum chloride had been collected. The temperature of the bed was then raised slowly to 550° C., and the rate of introduction of the titanium tetrachloride vapour was increased to approximately 2 grams per minute. After 2 hours the bed had increased in volume substantially and efficient fluidisation had become difficult. The supply of tetrachloride vapour was interrupted, and the bed was cooled to room temperature. It was found that the bed weighed 215 grams and consisted of 25% of aluminum, 15% of titanium metal, 50% of titanium dichloride and 10% of titanium trichloride. 138 grams of aluminum chloride had been collected separately.

89 grams of this bed were returned to the reaction tube and were fluidised in the manner described above, except that, when the temperature was raised to 550° C. titanium tetrachloride vapour was introduced at the rate of approximately 0.93 gram per minute. After 4 hours the supply of tetrachloride vapour was interrupted and the bed was cooled. The bed then weighed 225 grams, and consisted of titanium dichloride in admixture with 1.2 percent of aluminum compounds calculated as metallic aluminum. The product was a relatively coarse free-flowing black powder.

*Example 2*

100 grams of aluminum powder of −150 to +200 mesh B.S.S. was fluidised in the reaction tube described in Example 1 by the passage through the powder of dry oxygen-free argon at the rate of 2.0 litres per minute. The temperature was raised to 400° C., and then titanium tetrachloride vapour was introduced from the evaporator at the rate of approximately 1.8 grams per minute. After 30 minutes the content of aluminum metal in the fluidised bed was 80.4% and 50 grams of aluminum chloride had been collected. The temperature was then increased to 525° C. After a further 2 hours at that temperature the bed weighed 115 grams and contained 62 percent of aluminum metal. The bed was then heated at 550° C. for 2 hours while introducing the tetrachloride vapour at the rate of approximately 2 grams per minute. Fluidisation had then become difficult, and the supply of tetrachloride vapour was interrupted and the bed was cooled. The bed then weighed 250 grams and contained 14.5 percent of aluminum metal.

80 grams of this material was fluidised by passing 2.0 litres per minute of argon through it at 550° C., and titanium tetrachloride vapour was simultaneously introduced at the rate of approximately 1.2 grams per minute. After 2 hours the supply of tetrachloride vapour was interrupted, and the bed was cooled. 171 grams of bed material were obtained, which consisted of titanium dichloride in admixture with 1.55% of aluminum compounds calculated as metallic aluminum. The product was a free-flowing black powder of substantially the same particle size as the original aluminum powder.

*Example 3*

In a stainless steel reaction vessel of 3 inches internal diameter having near its lower end a plate provided with openings fitted with bubble caps, 1500 grams of aluminum powder of −150 to +200 mesh B.S.S. were fluidised by means of dry oxygen-free argon introduced at the rate of 14 litres per minute. The fluidised bed was heated to 400° C. by external heating, and titanium tetrachloride vapour was then introduced into the stream of argon at the rate of approximately 20 grams per minute. The rate of introduction of the argon was reduced sufficiently to keep the volume of the gaseous mixture passing through the bed in unit time approximately equal to that of the argon originally introduced. The temperature was slowly raised until, after 45 minutes, it had reached 450° C., at which stage the bed contained 86 percent of aluminum metal. The rate of introduction of titanium tetrachloride vapour was then increased to 40–45 grams per minute and the rate of introduction of argon was again reduced to keep the rate of flow of the gaseous mixture approximately at the original rate, and the temperature was raised to 500° C. The reaction was somewhat exothermic and the temperature was maintained at 540–550° C. by decreasing the supply of external heat. After about 6½ hours appreciable quantities of unreacted titanium tetrachloride appeared in the issuing gaseous mixture. The introduction of titanium tetrachloride vapour was continued until it became apparent that little of it was reacting in the bed, that is to say, until the rate of recovery of titanium tetrachloride was approximately equal to the rate of introduction thereof. The introduction of titanium tetrachloride was then stopped, and the bed was flushed with argon. After being cooled, the bed was removed in the form of a free flowing black powder, of which 9570 grams were collected. By analysis the powder contained 39.6% of titanium, 60.0% of chlorine and 0.27% of aluminum.

A total of 17100 grams of titanium tetrachloride were introduced during the process and approximately 1200 grams thereof were recovered as unreacted tetrachloride. From the issuing gaseous mixture a total of 7100 grams of aluminum chloride were collected.

Example 4

This example illustrates the invention as applied to a series of fluidised beds.

The reaction vessel (see FIGURE 1) consisted of a vertical tube 1 of Pyrex glass similar to that described in Example 1, but fitted with two porous plates 2 and 3 to allow the formation of a fluidised bed in both the reaction zones above the porous plates. One zone was above the other. The upper zone is referred to herein as zone A, and the lower zone as zone B. A conduit 5, controlled by a valve 6, led from the bed in zone A to just below the uppermost level of the bed in B, so that particles from the bed A could be passed by gravity to the bed in B.

Both zones were purged with argon and 100 grams of aluminum powder of −150 to +200 mesh B.S.S. were placed in zone A through conduit 7 and the powder fluidised by means of dry oxygen-free argon introduced at the rate of 2 to 2.5 litres per minutes through conduit 8. The temperature of the fluidised bed in zone A was raised to 400° C. by external heating and the titanium tetrachloride vapour was introduced into the lower end of the reaction tube 1 from the evaporator (not shown) via conduit 8 at the rate of approximately 1 gram per minute of titanium tetrachloride. After 20 minutes the fluidised bed had a content of aluminum metal of 89.2%.

The conduit 5 between zones A and B was then opened. The temperature of zone B was maintained at 550° C. Alminum metal was added in particulate form to zone A at such a rate through conduit 7 that the material passing down the conduit 5 to zone B had an aluminum metal content of 89.6%. After some 50 grams of material had passed down the conduit 5 to zone B the valve 6 on the conduit 5 was closed and the supply of aluminum metal to zone A was halted. Fluidisation of both beds was continued but after approximately 2 further hours of reaction in zone A the bed therein had grown to such a volume that the bed could no longer function as in Example 1. The bed material was then runoff through conduit 10 by opening valve 11. However, the reaction was continued in zone B until substantially all the titanium metal had been converted to titanium dichloride. The bed material was a free flowing powder consisting of titanium dichloride in admixture with about 1.45 percent of aluminum compounds calculated as metallic aluminum.

The bed contents of zone B were then discharged through conduit 12 by opening valve 13 and approximately half of the bed previously removed from zone A was placed in zone B. Reaction at 550° C. in zone B was then continued until substantially all the titanium was in the form of titanium dichloride. The titanium dischloride product from the zone B contained 1.65% of aluminum compounds calculated as metallic aluminum. The bed contents of zone B were again discharged, and the residual half of the contents of zone A was placed in zone B through conduit 14. Reaction at 550° C. was again carried out until substantially all the titanium had been converted to titanium dichloride. The product contained 1.3% of aluminum compounds calculated as metallic aluminum.

Example 5

In this example a vertical reactor 15 (see FIGURE II) similar to that described in Example 4, but with four reaction zones (C. D. E and F) was set up. The upper reaction zone was heated to 400° C., and the three other zones to 550° C. The titanium tetrachloride vapour and argon were introduced into the lowest zone and fed from the exit of the lowest to the entry point of the next lowest, and similarly through the upper zones. Aluminum metal was continuously introduced into the uppermost zone and the bed material was continuously discharged from the upper to the lower zones, being transferred from one zone to the next through conduits (16, 17 and 18) positioned for the purpose so as to permit the particles to proceed under the action of gravity. The aluminum metal content of the material leaving the first bed was 87.3%.

The lowest zone in the chain was provided with a discharge conduit 19 for continuous discharge and there issued from the bed a titanium dichloride material containing 1.65% of aluminum compounds calculated as metallic aluminum.

By way of comparison, experiments have been conducted with runs above the maximum content of 95% of aluminum in the fluidised bed at temperatures above 475° C. The following experiments clearly demonstrate the necessity of reducing the aluminum metal content below 95% before operation at the higher temperature.

Four experiments were carrid out in which titanium tetrachloride vapour was passed through a bed of aluminum particles at 400° C. and maintained in the fluidised state by the vapour for varying periods. At the end of each period a sample of the bed was withdrawn to determine its aluminum content, the temperature of the bed was raised by external heating at a rate such that it reached a temperature of 525° C. in 5 minutes, and the temperature of the bed was then maintained at 525° C. Samples of the beds, if they remained fluidised after reaching 525° C., were analysed at the end of each experiment. The other conditions were as follows:

Aluminum content of the aluminum powder=99.95%.
Particle size of aluminum powder=−150 to +200 mesh B.S.S.
Weight of bed at the outset=100 grams.
Rate of supply of $TiCl_4$ vapour=1.73 grams per minute.

The reaction tube was the same as that described in Example 1 of this specification, and argon was introduced at the rate of 2 litres per minute to fluidise the aluminum powder and maintain it fluidised while the bed was brought to 400° C. by external heating. The results were as follows:

| Experiment | A | B | C | D |
| --- | --- | --- | --- | --- |
| Period at 400° C. in minutes | 2½ | 7½ | 18 | 30 |
| Percent Al in bed | 98.9 | 96.0 | 90.3 | 80.4 |
| Period of heating up to 525° C. in minutes | | | 5 | 5 | 5 |
| Percent Al in bed | 96.9 | | | |
| Period at 525° C. in minutes | Nil | ½ | 60 | 120 |
| Percent Al in bed | | 94.5 | 71 (approx.) | 62 |
| Remarks | (¹) | (²) | (³) | (⁴) |

¹ Fluidisation ceased at 490° C. so that 525° C. was not reached.
² Fluidisation ceased after ½ minute at 525° C.
³ Still fluidised at end of 60 mins.
⁴ Still fluidised at end of 120 mins.

It will be seen that in Experiments A and B the period of heating at 400° C., was not long enough to bring the aluminum content of the bed below 95%, and that it was subsequently impossible to maintain fluidisation in the second stage.

We claim:
1. A process for the manufacture of titanium dichloride, wherein titanium tetrachloride vapour is reacted in the absence of a reactive gas with aluminium metal in at least two serially connected fluidised beds of particles containing the metal, or which series of beds an initial number is operated at a temperature within the range of from 400° C. to 475° C. and a final number at a temperature above 475° C. and not exceeding 650° C., aluminium particles are continuously added to the first fluidised bed and reacted in the said initial number of beds until the fluidised material consists of aluminium metal in a proportion not greater than 95% by weight and the remainder of non-volatile reaction products, the resulting fluidised material is continuously withdrawn from the said initial number of beds and introduced into the said final number of beds and reacted therein to produce a fluidised material consisting substantially wholly of titanium dichloride, and the fluidised material so produced is recovered as final product.

2. A process as recited in claim 1, wherein the reaction temperature in the said final number of beds does not exceed 550° C.

3. A process for the manufacture of titanium dichloride, wherein titanium tetrachloride vapour is reacted in the absence of a reactive gas at a temperature above 475° C. and not exceeding 650° C. with aluminium metal present in a fluidised bed of particulate material consisting essentially of aluminium metal in a proportion not greater than 95% by weight and at least one of the group consisting of titanium metal, titanium dichloride and titanium trichloride, titanium dichloride-containng material is continuously withdrawn from the bed, and particulate material selected from the group consisting of aluminium metal and aluminium metal in a proportion greater than 95% by weight with at least one of the group consisting of titanium metal, titanium dichloride and titanium trichloride is continuously added to the bed at a rate such that the aluminium metal content of the bed does not exceed 95% by weight.

4. A process as recited in claim 3, wherein the reaction temperature does not exceed 550° C.

5. A process for manufacturing titanium dichloride from titanium tetrachloride comprising the steps of providing for a bed of fluidizable particulate aluminium metal, heating and fluidizing said bed, supplying titanium tetrachloride vapor to react with said particulate aluminium metal in the absence of a reactive gas and concomitantly maintaining said bed at an initial reaction temperature within the range of from 400° C. to 475° C. until the proportion of aluminium metal in said bed is reduced to an amount not greater than 95% by weight within the remainder being non-volatile reaction products composed of titanium metal, titanium trichloride, and titanium dichloride, and then raising the reaction temperature of said bed substantially above 475° C. but not exceeding 650° C. while continuing to supply titanium tetrachloride vapor to react with titanium metal and with any remaining aluminium metal in said bed in the absence of a reactive gas until the material in said bed consists substantially entirely of titanium dichloride.

References Cited by the Examiner

UNITED STATES PATENTS

| 2,745,735 | 5/1956 | Byrns. | |
| 2,790,704 | 4/1957 | Lewis | 23—87 |
| 2,915,379 | 12/1959 | Agarwal | 75—26 |

FOREIGN PATENTS

| 513,526 | 6/1955 | Canada. |

MAURICE A. BRINDISI, *Primary Examiner.*

GEORGE D. MITCHELL, *Examiner.*